United States Patent
McGill

[11] Patent Number: 5,992,439
[45] Date of Patent: Nov. 30, 1999

[54] INTERFACE APPARATUS FOR ADAPTING A GAS FLOW VALVE TO A GAS METER

[76] Inventor: James C. McGill, 4312 Lisa Dr., Union City, Calif. 94587

[21] Appl. No.: 09/027,197

[22] Filed: Feb. 20, 1998

Related U.S. Application Data

[60] Provisional application No. 60/038,795, Feb. 21, 1997.
[51] Int. Cl.[6] ................................................. F16K 43/00
[52] U.S. Cl. ........................ 137/15; 137/315; 73/201; 285/30
[58] Field of Search .................. 137/15, 315; 73/201; 285/30, 12, 18

[56] References Cited

U.S. PATENT DOCUMENTS

| | | | |
|---|---|---|---|
| 2,579,656 | 12/1951 | Douglas et al. | 73/201 |
| 3,238,969 | 3/1966 | Champion | 73/201 |
| 3,245,257 | 4/1966 | Anderson | 73/201 |
| 3,256,735 | 6/1966 | Smith | 73/201 |
| 3,266,308 | 8/1966 | Howarth | 73/201 |
| 3,296,859 | 1/1967 | Stewart | 73/201 |
| 3,946,754 | 3/1976 | Cook | 73/201 |
| 4,327,760 | 5/1982 | Lancaster | 137/15 |
| 5,042,528 | 8/1991 | England et al. | 73/201 |
| 5,437,300 | 8/1995 | Winnie et al. | 73/201 |

*Primary Examiner*—George L. Walton

[57] ABSTRACT

A gas flow valve is adapted to mimic an existing plumbing arrangement between the gas flow meter 10 and inlet and outlet plumbing at a point of use. By providing a similar arrangement of mating parts and union nuts, the gas flow valve 20 can be easily and quickly installed between the inlet and outlet plumbing and the gas flow meter without having to replumb the plumbing. The gas flow valve 20 can either directly connect between both the inlet and outlet plumbing and the gas flow meter, or could connect between either the inlet or the outlet plumbing and the gas flow meter 10, with the other connection being provided either by the original connection between the gas flow meter and the plumbing or by an additional inserted pipe.

13 Claims, 4 Drawing Sheets

5,992,439

INTERFACE APPARATUS FOR ADAPTING A GAS FLOW VALVE TO A GAS METER

This is a utility application claiming priority from provisional application 60/038,795, filed Feb. 21, 1997.

BACKGROUND OF THE INVENTION

1. Field of the Invention

The present invention relates to the installation of gas flow valves, such as seismic safety valves, to existing plumbing having a gas meter. More particularly, the present invention is directed to a method and apparatus that enables the installation of a gas flow valve into existing plumbing having a gas meter.

2. Description of the Prior Art

Typical known gas meters have an arrangement as demonstrated in FIG. 1. In this figure, an inlet pipe 11 is connected through plumbing 12 to a gas meter 10 before the gas flows into a point of use of the gas, for example, a residence. The plumbing 12 is connected to the gas meter 10 by a union nut 13. The gas meter 10 is a known device having such a union nut 13, as well as a union nut 14 at the outlet of the gas meter. The union nut 14 is originally connected to a service tee 15. When the meter is replaced, the service tee 15 is used to maintain a continuous flow of gas through the system by removing the plug end of the tee 15 and inserting a device into the end of the tee that is connected to a portable gas tank. This allows service, such as the replacement of the gas meter 10, to be performed without having to stop the flow of gas through the remainder of the gas system.

SUMMARY OF THE INVENTION

The object of the present invention is to provide an easy way of retrofitting a generic shutoff valve with existing plumbing having a gas meter. While it might be considered that, upon recognizing this desire, one could replumb the arrangement to fit the valve, the present inventor has arrived at a solution permitting simple and rapid installation of a gas flow valve at the location of the gas meter without replumbing.

According to one embodiment of the present invention., a gas flow valve is provided with an outlet and an inlet on one side thereof, each having respective union nuts for engagement with the inlet and the outlet of the gas meter, respectively, Furthermore, the gas flow valve is provided with an inlet and an outlet at another portion thereof for connection with the inlet plumbing and the outlet plumbing leading to the residence or other point of use. The inlet and the outlet at the other part of the gas flow valve connect with the union nuts of the inlet plumbing and the outlet plumbing. In this way, the gas flow valve serves as an interface between the plumbing serving as the inlet of the gas and the outlet of the gas to the point of use, and the gas flow meter.

In view of the fact that the gas flow valve effectively has two gas inlets and two gas outlets, one gas inlet is connected with one gas outlet through a dummy passage, whereas the actual valving portion is provided in the other passage between the other gas inlet and the other gas outlet.

Thus, upon installation of the gas flow valve, with a gas meter having been previously installed and connected to inlet plumbing and outlet plumbing going to the point of use, the gas meter is simply disconnected. Then, the gas flow valve is connected to the point where the gas meter was previously connected, with one gas inlet and one gas outlet being connected to the inlet plumbing and the outlet plumbing, respectively. The gas meter is then reconnected by connecting the gas meter to the union nuts of the gas flow valve at the other gas flow outlet and gas flow inlet of the gas flow valve.

Thus, in effect, the gas flow valve is designed so as to have the same inlet and outlet arrangement, with respect to the plumbing, as the gas flow meter. Furthermore, the gas flow valve is designed to have the same gas flow outlet and gas flow inlet arrangement, with respect to the gas flow meter, as the inlet and the outlet plumbing. In this way, no plumbing changes are necessary to the existing plumbing. The gas flow valve simply has to be installed.

As an alternative to having a gas flow valve which has connections for both the inlet and outlet plumbing, and connections for both the inlet and outlet of the gas flow meter, the gas flow valve could also be provided so as to simply connect between either the inlet plumbing and the inlet of the gas flow meter, or the outlet plumbing and the outlet of the gas flow meter. In this instance, the other side would have a simple extension or dummy pipe having the same length or separation as the gas flow valve connected between the point in the plumbing and the point on the gas flow meter that were not connected to the valve. Otherwise, this arrangement could be simply employed and installed similar to the above-described arrangement.

In instances where a gas flow meter has been installed at a point having little ground clearance, the installation might be difficult, in that the meter might not be capable of being lowered a sufficient amount to allow the gas valve to be installed. In this case, an S-shaped link is connected between the inlet plumbing and the inlet of the gas valve, with the outlet of the gas valve being connected to the inlet of the gas meter. The gas meter would then have its other connection, the outlet, connected to the usual inlet. Alternatively, the S-shaped linking pipe and the gas valve 20 could be connected between the outlet of the gas meter and the outlet plumbing going to the point of use.

BRIEF DESCRIPTION OF THE DRAWINGS

The above and further features and advantages of the present invention will be further discussed below with reference to the accompanying drawings, in which.

DETAILED DESCRIPTION OF THE PREFERRED EMBODIMENTS

Figure 1:
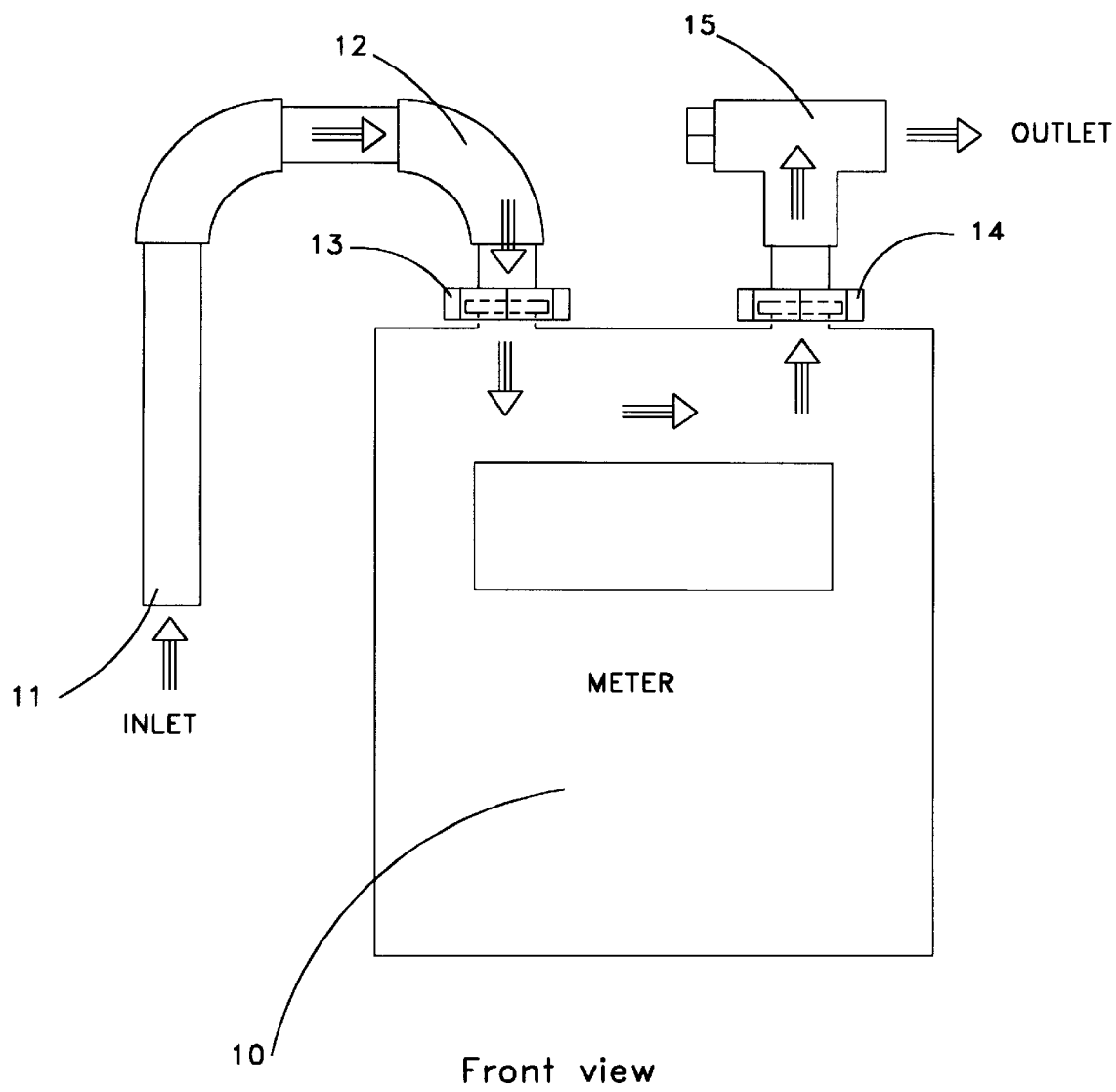
FIG. 1 is a schematic view of a typical arrangement of a gas flow meter.

A gas flow meter 10 has a gas inlet 23 and a gas outlet 24. These mating parts 23 and 24 would, in the prior art system, be connected to the union nuts, such as union nuts 13 and 14, of inlet plumbing 11, 12 and outlet plumbing 15. However, with the present invention, it is desired to retrofit a gas flow valve to the point of use of the gas, as at a residential home, a business or other point where it may be desired to be able to shut off the flow of gas either at will or upon certain seismic or other activities taking place.

The type of valve 20 could be any suitable valve that is desired to be retrofitted for purposes of shutting off the flow of gas. One particularly desirable kind of valve is a seismic safety valve that automatically shuts off the flow of gas upon the occurrence of a certain level of seismic activity. One valve of this type is disclosed in U.S. Pat. No. 5,409,031, incorporated herein by reference, and another in provisional U.S. patent application Ser. No. 60/030,284. Other suitable gas flow valves that could be adapted for use as in the present invention are disclosed in U.S. Pat. Nos. 4,311,171, 4,565,208, 4,475,565, 4,903,720, and 5,119,841.

The gas flow valve 20 according to the present invention can be any of the above valves, as long as it is modified to have an appropriate arrangement of gas inlets and gas outlets in accordance with the following discussion.

Figure 2:
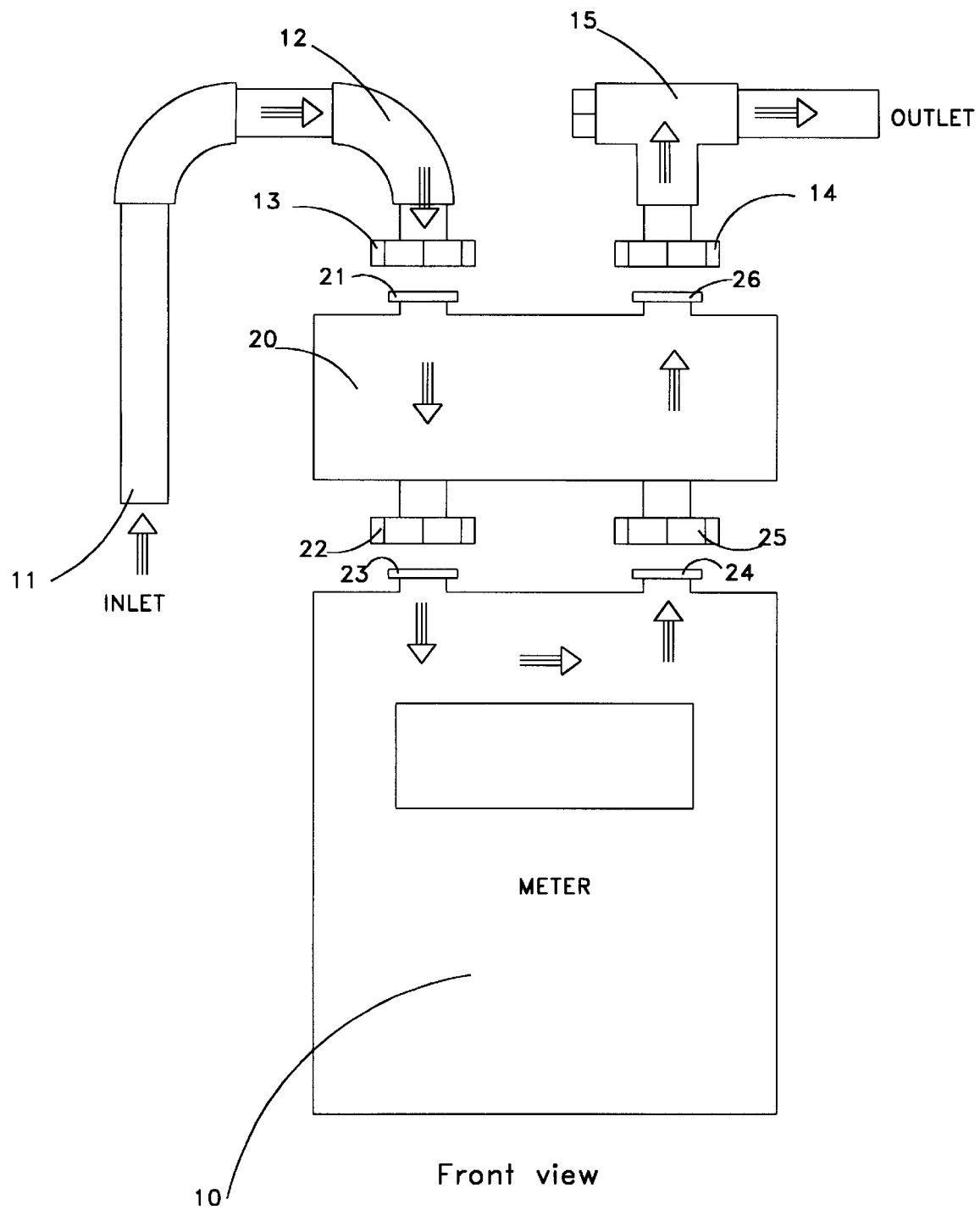
FIG. 2 is a schematic view of a gas flow valve interface arrangement, showing some parts separated, according to a first embodiment of the present invention.

That is, the gas flow valve 20 as shown in FIG. 2 has mating parts 21 and 26 corresponding to the mating parts 23 and 24 of the gas flow meter. As shown in FIG. 2, they can be provided in the upper surface of the gas flow valve 20 as installed, assuming the gas flow meter 10 depends from the inlet plumbing 11, 12 and outlet plumbing 15. Furthermore, the gas flow valve 20 has an outlet and an inlet at 22 and 25, 22 and 25 being union nuts corresponding to union nuts 13 and 14 of the inlet plumbing 11, 12 and outlet plumbing 15.

It is noted that the inlet plumbing 11, 12 includes an inlet pipe 11 and a curved plumbing portion 12 extending to the union nut 13. The outlet plumbing 15 includes a T-shaped member, also known as a service tee. When a meter is ordinarily replaced, the service tee is used to supply a continuous flow of gas through the system, because the plug end of the tee can be removed. After removal of the plug end, a device is inserted into the end that is connected to a portable gas tank. This allows the replacement of the gas meter (or other service) to be performed without having to stop the flow of gas through the remainder of the gas system.

As discussed above, the gas flow valve can be a valve as in one of the above-referenced U.S. patents, but with the following modifications. That is, as can be clearly appreciated from this discussion, the valve as shown in FIG. 2 is required to have two gas flow inlets and two gas flow outlets. One inlet and outlet correspond to a connection between the inlet plumbing 11, 12 and the mating part or inlet part 23 of the gas flow meter 10. Another inlet and outlet of the gas flow valve 20 corresponds to the connection between the mating part or outlet part 24 of the gas flow meter 10 and the union nut 14 of the outlet plumbing 15.

As can be clearly appreciated, gas passages extend through the gas flow valve 20 between the respective inlets and outlets, as illustrated by the arrows in FIG. 2. In one of these gas flow passages, the valving arrangement is discussed in the above-referenced U.S. patents is located. The housings are simply modified to allow for the mating parts 21 and 26 and the union nuts 22 and 25 to be located for the respective positions of the union nuts 13 and 14 of the inlet and outlet plumbing and the mating parts 23 and 24 of the gas flow meter. In other words, the gas flow passage of anyone of these valves is adapted in accordance with the present invention to have a retrofit capability by providing the respective mating parts and union nuts at locations corresponding to those for the gas flow meter and the inlet and outlet plumbing.

When installing the gas flow valve 20 into a prior arrangement as illustrated in FIG. 1, the union nuts 13 and 14 connecting to the mating parts 23 and 24 are loosened so as to drop the meter 10. The meter 10 is lowered and the valve 20 inserted between the meter 10 and the inlet plumbing and outlet plumbing. Then the mating parts 21 and 26 are connected to the union nuts 13 and 14, respectively, while the mating parts 23 and 24 of the gas flow meter 10 are connected to the union nuts 22 and 25. Accordingly, the gas flow valve 20 is easily and quickly connected into the existing plumbing without having to replumb, and without having to modify the gas flow meter. This advantage, according to the present invention, can result in significant savings of costs associated with plumbers when having to install gas flow valves, because no modification of the existing plumbing needs to take place.

Figure 3:
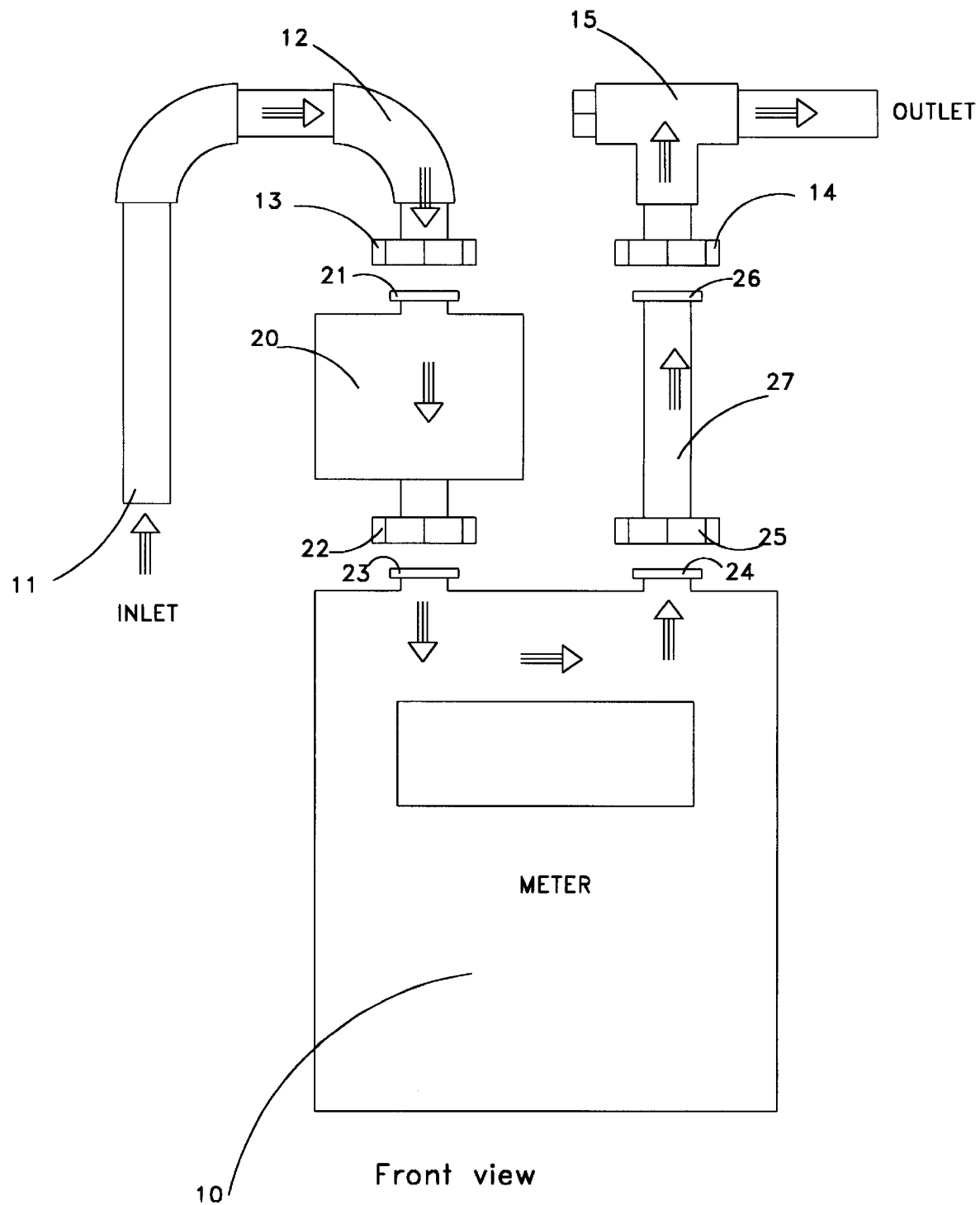
FIG. 3 is a schematic view of a gas flow valve interface arrangement according to a second embodiment of the present invention.

A second embodiment according to the present invention is demonstrated by FIG. 3. This embodiment is essentially similar to that of FIG. 2, in operation and in effect, except for the following. That is, the gas flow valve 20 is only located between one mating part 23 or 24 of the gas flow meter 10 and one union nut 13 or 14 of the inlet plumbing 12, and outlet plumbing 15. A pipe or sleeve 27, having a corresponding mating part 26 and union nut 25, is inserted at the other side from the gas flow valve 20 upon installation of the gas flow valve 20, this pipe 27 having the same length as the gas flow valve 20. Thus, the same advantages as in the embodiment of FIG. 2 are achieved. Obviously, the gas flow valve 20 could be mounted either at the inlet side of the gas with respect to the gas flow meter 10 or at the outlet side thereof.

Figure 4:
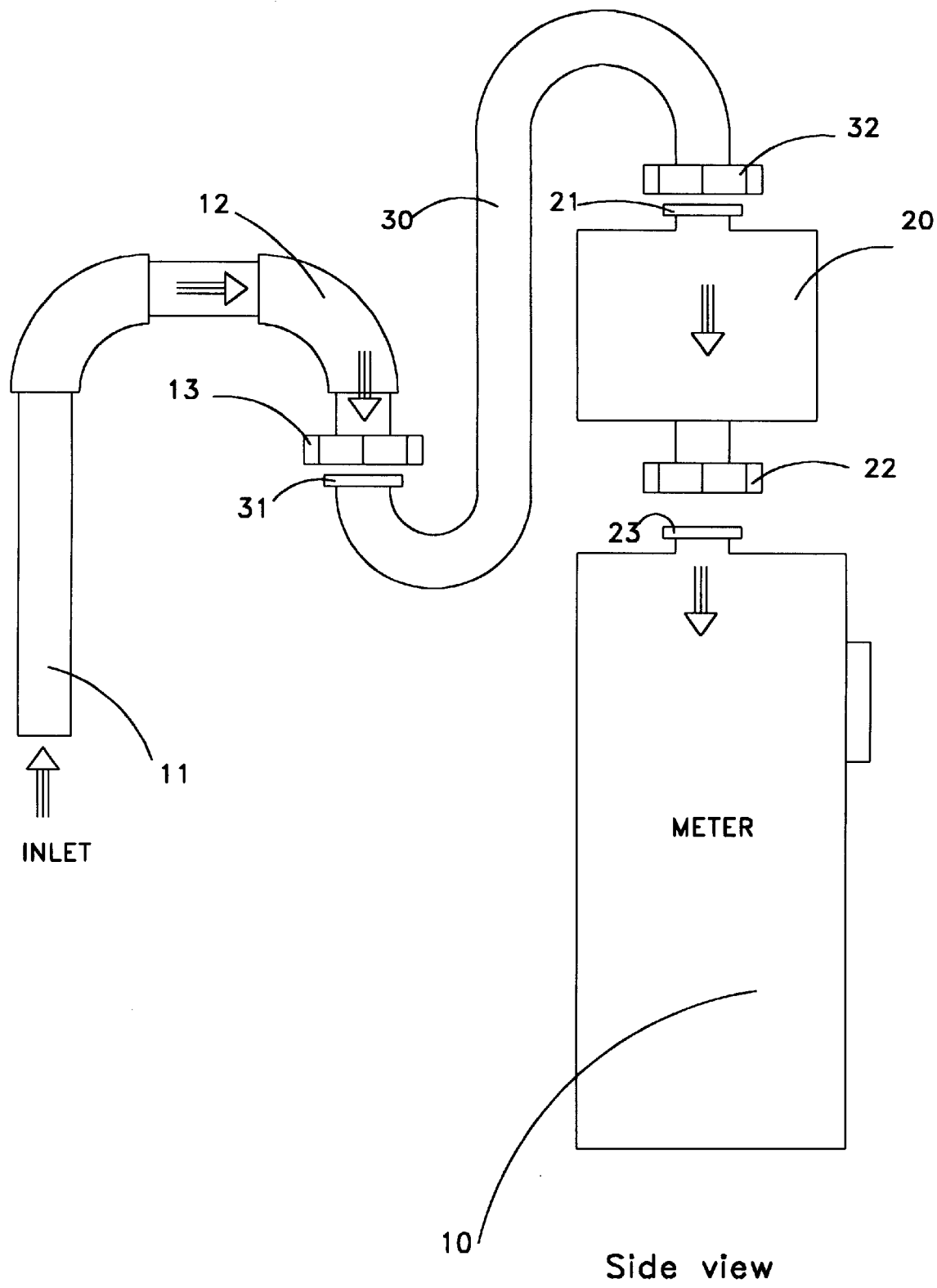
FIG. 4 is a schematic view of a third embodiment of a gas flow valve interface arrangement according to the present invention.

FIG. 4 illustrates a third embodiment according to the present invention. This embodiment is essentially similar to the other embodiments in the provision of a gas flow valve 20. However, this embodiment takes into consideration the problem that arises in situations where a lack of ground clearance may prevent the lowering of the gas flow meter 10 to a sufficient degree to allow the insertion of the gas flow valve 20 between the union nut 13 and the mating part 23, for example. In this instance, an S-shaped link pipe 30 could be provided. This pipe has a union nut 32 corresponding to the union nut 13, and a mating part 31 corresponding to the mating part 23. Thus, this pipe connects between the mating part 21 of the gas flow valve 20 and the union nut 13 of the inlet plumbing 11, 12. The gas flow valve 20, similar to that illustrated in FIG. 3, is inserted between the end of the S-shaped link 30 and the gas flow meter 10, as illustrated and described above. The other mating part 24 of the gas flow meter 10 can remain connected to the union 14 of the outlet plumbing 15, with it simply being pivoted from its original position to allow for insertion of the S-shaped link 30.

Tlus, according to the present invention, the gas flow valve 20 can be retrofitted into existing gas flow meter arrangements without having to replumb such arrangements. This is achieved by the gas flow valve 20 being adapted to mimic the plumbing arrangement and connections of the existing plumbing as described hereinabove so as to interface between the gas flow meter 10 and the existing plumbing. This allows for a significant reduction in the costs associated with the installation of such gas flow valves 20.

I claim:

1. A method of installing a gas flow shutoff valve into existing gas plumbing that is connected to a gas meter, the existing gas plumbing including a plumbing gas outlet and a plumbing gas inlet, and the gas meter having a meter gas inlet connected to the plumbing gas outlet and a meter gas outlet connected to plumbing gas inlet, said method comprising:

providing a gas flow shutoff valve comprising a housing having a valve gas inlet and a valve gas outlet, a first gas conduit extending between the valve gas inlet and the valve gas outlet, and a shutoff valve arrangement along the conduit between the valve gas inlet and the valve gas outlet, whereby gas flow can be shut off between the valve gas inlet and the valve gas outlet by activation of the shutoff valve;

disconnecting one of a) the meter gas inlet from the plumbing gas outlet and b) the meter gas outlet from the plumbing gas inlet; and connecting the gas flow shutoff valve between one of a) the meter gas inlet and the plumbing gas outlet and b) the meter gas outlet and the plumbing gas inlet by one of a) connecting the valve gas inlet to the plumbing gas outlet and connecting the valve gas outlet to the meter gas inlet and b) connecting the valve gas inlet to the meter gas outlet and the valve gas outlet to the plumbing gas inlet, by providing for the gas flow path between the other of a) the meter gas inlet and the plumbing gas outlet and b) the meter gas outlet and the plumbing gas inlet to be an open flow path which has no valve there along, and without repositioning the plumbing gas outlet and the plumbing gas inlet of the existing gas plumbing, such that activation of the gas flow shutoff valve will shut off the flow of gas between the plumbing gas outlet and the plumbing gas inlet.

2. The method of claim 1, wherein said disconnecting comprises disconnecting both a) the meter gas inlet from the plumbing gas outlet and b) the meter gas outlet from the plumbing gas inlet, and said connecting further comprises connecting a second gas conduit between the other of a) the meter gas inlet and the plumbing gas outlet and b) the meter gas outlet and the plumbing gas inlet, without repositioning the plumbing gas outlet and the plumbing gas inlet of the existing gas plumbing.

3. The method of claim 2, wherein the housing has the second gas conduit therein.

4. The method of claim 2, wherein the second gas conduit comprises a pipe separate from the housing of the gas flow shutoff valve.

5. The method of claim 1, wherein the valve gas inlet is connected to one of the plumbing gas outlet and the meter gas outlet, and the valve gas outlet is connected a) to the meter gas inlet if the valve gas inlet is connected to the plumbing gas outlet, and b) to the plumbing gas inlet if the valve gas inlet is connected to the meter gas outlet, and a gas passage is connected between a) the meter gas outlet and the plumbing gas inlet if the valve gas inlet is connected to the plumbing gas outlet, and b) the plumbing gas outlet and the meter gas inlet if the valve gas inlet is connected to the meter gas outlet.

6. The method of claim 1, wherein:

said step of disconnecting comprises disconnecting only one of a) the meter gas inlet from the plumbing gas outlet and b) the meter gas outlet from the plumbing gas inlet; and said step of connecting further comprises connecting a second gas flow conduit to the gas flow valve such that the second gas flow conduit is connected between one of a) the meter gas inlet and the plumbing gas outlet and b) the meter gas outlet and the plumbing gas inlet, without repositioning the plumbing gas outlet and the plumbing gas inlet of the existing gas plumbing.

7. The method of claim 6, wherein the second gas flow conduit is S-shaped.

8. A gas flow valve assembly for retrofitting a gas flow shutoff valve with existing gas plumbing that includes a gas meter, the plumbing including a plumbing gas outlet and a plumbing gas inlet, the gas meter including a meter gas inlet and a meter gas outlet at predetermined positions, and said assembly comprising:

a gas flow shutoff valve comprising a housing having a first valve gas flow inlet a first valve gas flow outlet on opposite sides thereof, a first gas conduit extending through said housing between said first valve gas flow outlet and said first valve gas flow inlet, a shutoff valve arrangement located along said first gas conduit, a second valve gas flow inlet and a second valve gas flow outlet on opposite side of said housing, and a second gas conduit extending through said housing between said second valve gas flow inlet and said second valve gas flow outlet, said second gas conduit being an open flow path which has no valve there along;

wherein said first valve gas flow inlet and said second valve gas flow outlet are on a first common side of said gas flow valve and spaced at the same spacing as the predetermined positions, and wherein said second valve gas flow inlet and said first valve gas flow outlet are on a second common side opposite from said first common side with respect to said housing and also spaced at the same spacing as the predetermined positions; and wherein said first valve gas flow inlet and said first valve gas flow outlet are spaced from each other a distance that is equal to the distance which said second valve gas flow inlet and said second valve gas flow outlet are spaced from each other;

whereby said gas flow shutoff valve can be retrofitted between the gas meter and the existing gas plumbing without repositioning the plumbing gas outlet and the plumbing gas inlet of the existing gas plumbing.

9. A gas flow valve assembly for retrofitting a gas flow shutoff valve with existing gas plumbing that includes a gas meter, the plumbing including a plumbing gas outlet and a plumbing gas inlet, the gas meter including a meter gas inlet and a meter gas outlet, and said assembly comprising:

a gas flow shutoff valve comprising a housing having a valve gas flow inlet and a valve gas flow outlet, a first gas conduit extending between said valve gas flow inlet and said valve gas flow outlet, and a shutoff valve arrangement located along said first gas conduit so as to be capable of shutting off gas flow between said valve gas flow inlet and said valve gas flow outlet, said valve gas flow inlet and said valve gas flow outlet being located on of said housing and separated a predetermined distance from each other;

a pipe having a pipe inlet and a pipe outlet, said pipe inlet and said pipe outlet being separated a predetermined distance from each other that is the same as the predetermined distance separating said valve gas flow inlet and outlet in one direction, and said pipe forming a second gas flow conduit between said pipe inlet and said pipe outlet that is an open flow path; and connecting elements on said valve gas flow inlet and said valve gas flow outlet and on said pipe inlet and said pipe outlet for connecting said gas flow valve and said pipe with the plumbing gas outlet and the plumbing gas inlet and with the meter gas inlet and the meter gas outlet;

wherein said gas flow shut off valve, said pipe, and said connecting elements are capable of being assembled together and positioned together with the gas meter between the plumbing gas outlet and the plumbing gas inlet such that activation of said shut off valve will shut off the flow of gas from the plumbing gas outlet to the plumbing gas inlet.

10. The gas flow valve assembly of claim 9, wherein:

said pipe extends straight between said pipe inlet and said pipe outlet; and wherein said gas flow shutoff valve, said pipe and said connecting elements are arranged such that if, in one case, said valve gas flow inlet is connected to the plumbing gas outlet, said valve gas outlet is connected to said meter gas inlet, said pine inlet is connected to said meter gas outlet, and said pipe outlet is connected to the plumbing gas inlet, and, in another case, said valve gas flow inlet is connected to said meter gas outlet, said valve gas flow outlet is connected to the plumbing gas inlet, said pipe inlet is connected to the plumbing gas outlet, and said pipe outlet is connected to said met gas inlet, activation of said shutoff valve shuts off the flow of gas from the plumbing gas outlet to the plumbing gas inlet.

11. The gas flow valve assembly of claim 9, wherein:

said pipe extends in an S-shape between said pipe inlet and said pipe outlet; and said gas flow shutoff valve, said pipe and said connecting elements are arranged such that if said pipe and said valve are connected together and connected between one of the plumbing outlet and said meter gas inlet, and the plumbing inlet and said meter gas outlet, activation of said shutoff valve shuts off the flow of gas from the plumbing gas outlet to the plumbing gas inlet.

12. The gas flow valve assembly of claim 11, wherein said pipe is shaped such that, if said first gas conduit is positioned so that a vertical line connects said valve gas flow inlet and said valve gas flow outlet, and if said pipe outlet is connected to said valve gas flow inlet, said pipe inlet is located at the same horizontal level as said valve gas flow outlet.

13. A gas flow valve assembly for retrofitting a gas flow shutoff valve with existing gas plumbing that includes a gas meter, the plumbing including a plumbing gas outlet and a plumbing gas inlet, the gas meter including a meter gas inlet and a meter gas outlet, and said assembly comprising:

a gas flow shutoff valve comprising a housing having a valve gas flow inlet and a valve gas flow outlet, a first gas conduit extending between said valve gas flow inlet and said valve gas flow outlet, and a shutoff valve arrangement located along said first gas conduit so as to be capable of shutting off gas flow between said valve gas flow inlet and said valve gas flow outlet;

a curved pipe having a pipe inlet and a pipe outlet, said pipe inlet and said pipe outlet being separated a predetermined distance from each other that is the same as the predetermined distance separating said valve gas flow inlet and outlet, and said pipe forming a second gas flow conduit between said pipe inlet and said pipe outlet that is an open flow path; and connecting elements on said valve gas flow inlet and said valve gas flow outlet and on said pipe inlet and said pipe outlet for connecting said gas flow valve and said pipe with the plumbing gas outlet and the plumbing gas inlet and with the meter gas inlet and the meter gas outlet;

wherein said gas flow shutoff valve, said pipe and said connecting elements are arranged such that if said pipe and said valve are connected together and connected between one of the plumbing outlet and said meter gas inlet, and the plumbing inlet and said meter gas outlet, activation of said shutoff valve shuts off the flow of gas from the plumbing gas outlet to the plumbing gas inlet.

* * * * *